Nov. 3, 1953         C. D. WHITEHEAD              2,657,574
                     ENGINE TEST BENCH
Filed Nov. 8, 1948                          5 Sheets-Sheet 1

INVENTOR
C.D. WHITEHEAD
by Wilkinson

Nov. 3, 1953         C. D. WHITEHEAD         2,657,574
                    ENGINE TEST BENCH
Filed Nov. 8, 1948                      5 Sheets-Sheet 2

INVENTOR
C. D. WHITEHEAD
by Wilkinson Mawhinney
       Attorneys

Nov. 3, 1953

C. D. WHITEHEAD 2,657,574

ENGINE TEST BENCH

Filed Nov. 8, 1948

Inventor
C. D. WHITEHEAD

BY Wilkinson & Mawhinney
Attorneys

Nov. 3, 1953     C. D. WHITEHEAD     2,657,574
ENGINE TEST BENCH
Filed Nov. 8, 1948     5 Sheets-Sheet 5
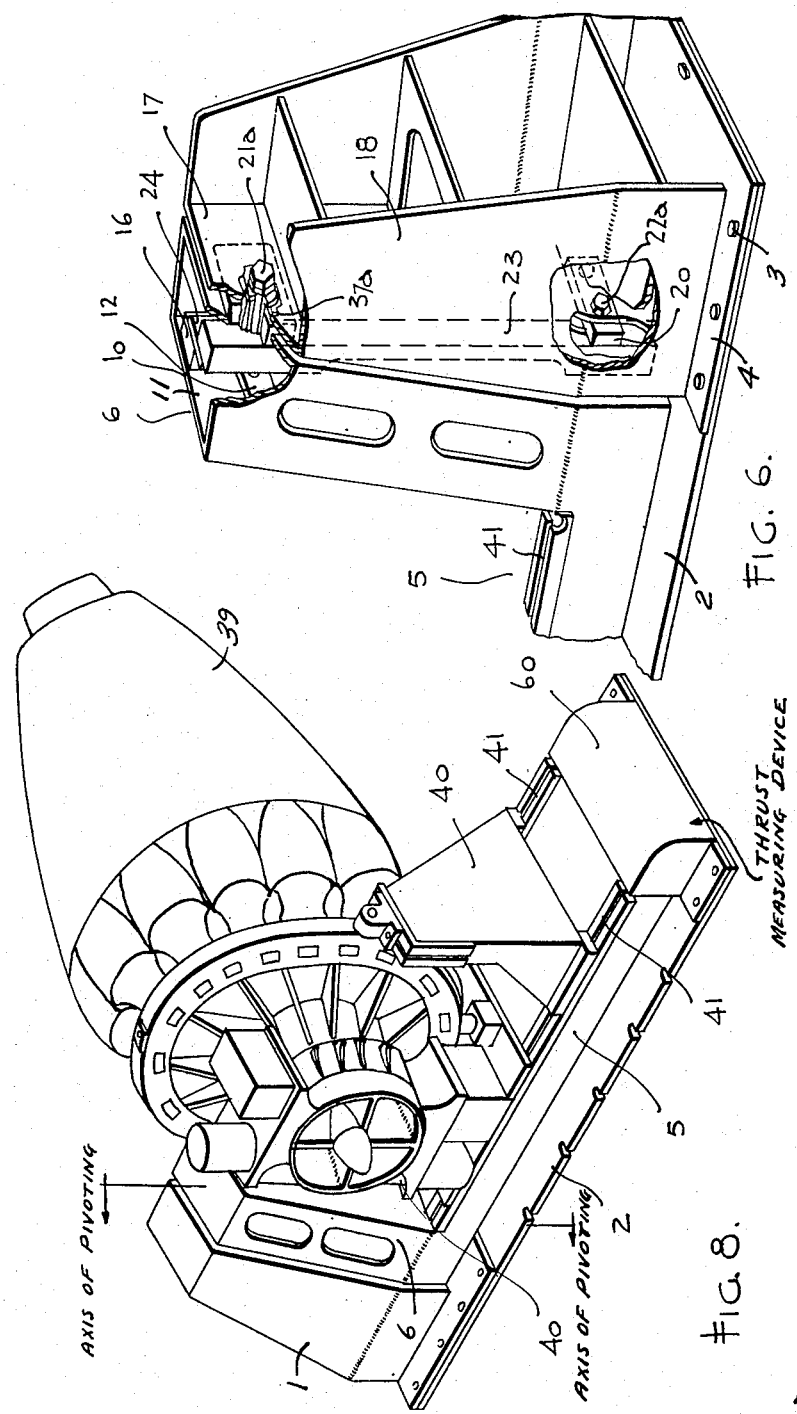
INVENTOR
C. D. WHITEHEAD
by Wilkinson Mawhinney
Attorneys Patented Nov. 3, 1953

2,657,574

UNITED STATES PATENT OFFICE 2,657,574

ENGINE TEST BENCH

Cyril Dorking Whitehead, Cardiff, Wales, assignor to John Curran Limited, Cardiff, Wales, Great Britain Application November 8, 1948, Serial No. 58,975

Claims priority, application Great Britain November 18, 1947

6 Claims. (Cl. 73—116)

This invention relates to engine test benches and particularly to test benches for testing engines of the kind in which the performance is measured by the thrust exerted by the engine, that is to engines known as jet engines.

It is an object of the invention to provide a satisfactory test bench for engines of the kind referred to which is comparatively simple to construct and which is capable of accommodating engines of different capacities and having different types of engine mounting.

Owing to the rapid development of jet engines, especially gas turbine engines, which is now taking place it is desirable that a test bench for such engines should be capable of receiving engines of different sizes while making it possible to obtain thrust readings of satisfactory accuracy.

According to the invention an engine test bench comprises a beam arranged to support an engine to be tested so that the direction of the engine thrust is transverse to an axis about which the beam is arranged to pivot and which is located at an end of the beam and means for measuring the thrust exerted by the beam at a position displaced from said axis.

Further according to the invention an engine test bench comprises a platform which is arranged to support an engine placed above it and which is supported for movement about a vertical axis located at one end of the platform and means for measuring the thrust exerted by the platform at a position displaced from the said axis.

An additional feature of the invention consists in securing the platform to a rigid support by resilient straps arranged at right angles one to another so that the vertical axis about which the platform is adapted to pivot is disposed in a plane which intersects both straps of a pair normally disposed one with respect to the other.

The invention will be described by way of example with reference to the accompanying drawings which show a test bench according to the invention and in which Fig. 1 is a side elevation Fig. 2 is a plan view on Fig. 1.

Fig. 6 is a fragmentary perspective view also on an enlarged scale illustrating the means for levelling the platform.

Fig. 7 is an enlarged view of a portion of Fig. 6 and

Fig. 8 is a pictorial representation showing an engine mounted on the platform.

Figure 1:
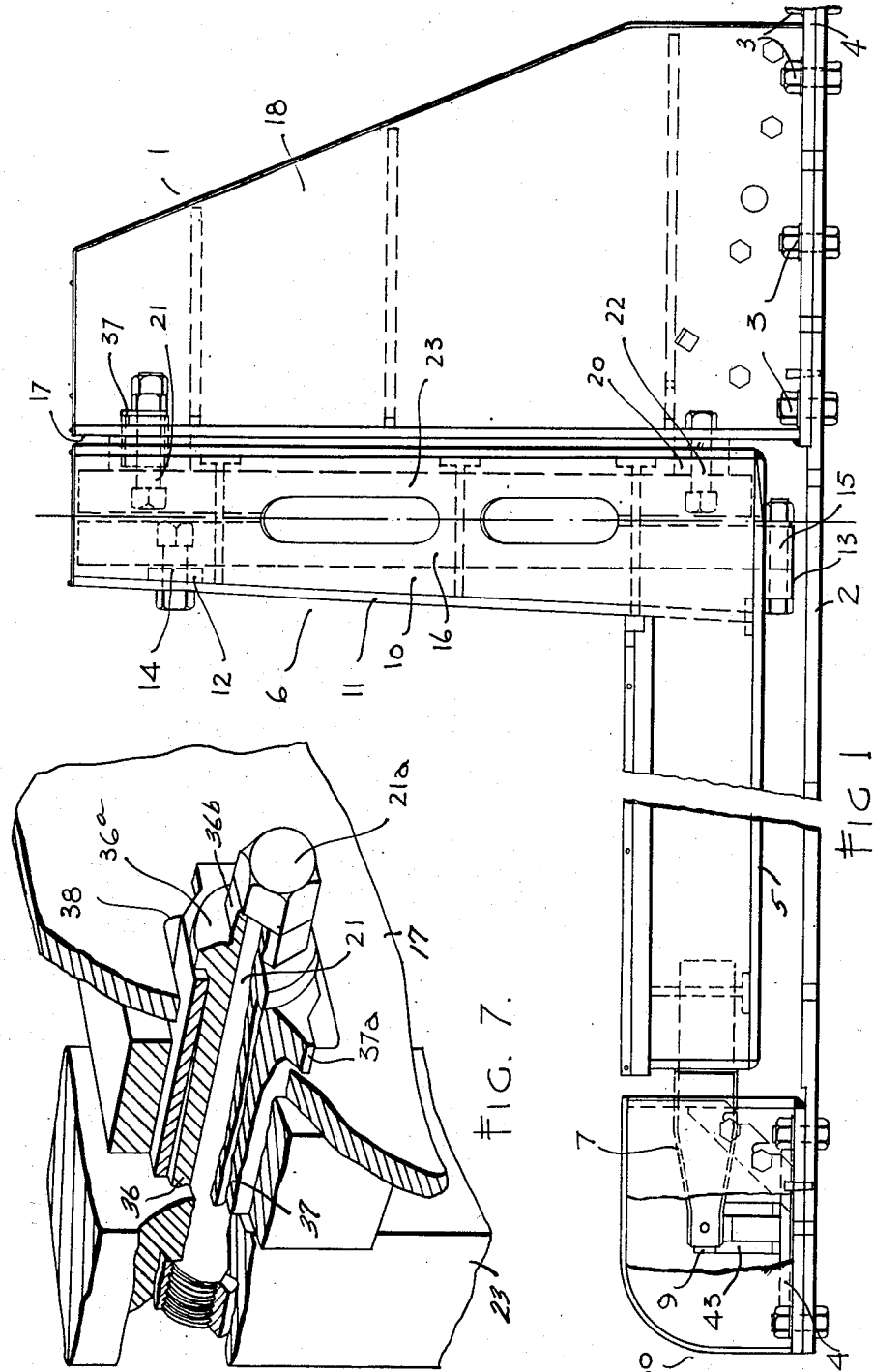

Referring to the accompanying drawings, a rigid column 1 is secured to a base-plate 2 by bolts 3 which pass through flanges 4 at the base of the column. Pivotally carried by the column 1, by means which will be described, is a platform 5, the platform, at one end thereof, having an upright pillar 6 adjacent the column 1.

Projecting from the other end of the platform 5 is an arm 7 which is rigid with the platform. The free end of this arm 7 is arranged to make contact with a thrust measuring device referred to generally by the reference 54 and carried by a fixed support 9.

The baseplate 2 is adapted to be secured to a foundation of which the upper plane surface may be at, or slightly below, ground level so that the upper surface of the platform need only be about one foot at most above ground level and the mounting of engines on the platform is accordingly facilitated.

The pillar 6 is a rigid construction including side walls 10 and front wall 11. Secured, as by welding, to the inside surface of the front wall 11 is a rigid bar 12 and similarly attached to the underside of the platform 5 is a heavy section rectangular bar 13. Fixed to the bar 12 and to the bar 13 by bolts 14 and 15 respectively is a vertically extending bar 16.

Figure 4:
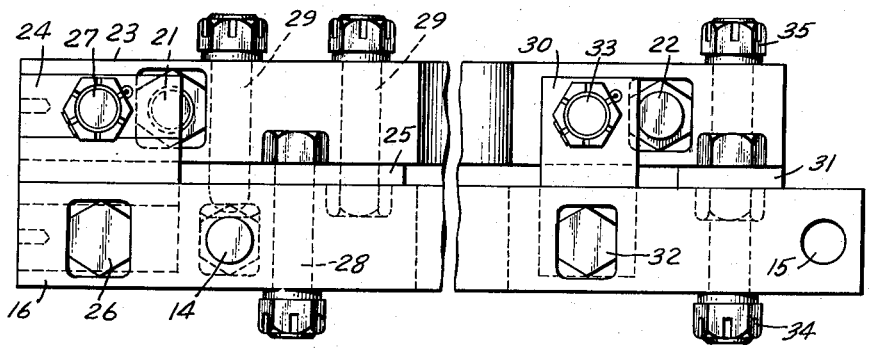
Figs. 4 and 5 are views on an enlarged scale of the resilient strap pivotal support.
Figure 5:
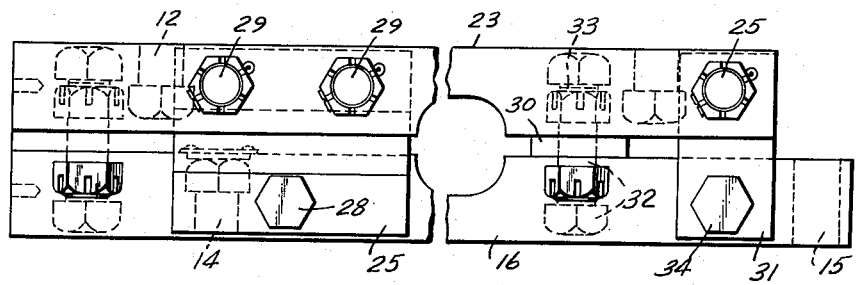

The column 1 is also a rigid construction which comprises a front wall 17 and side walls 18. To the outer surface of the front wall 17 is secured, as by welding, a transverse bar 20. Fixed to a block 37 slidable in the wall 17 and to the bar 20, by bolts 21 and 22 respectively, is a vertically extending bar 23 which is generally similar to the bar 16. The bars 16 and 23 are shown more clearly in Figs. 6 and 7 and are generally rectangular in section except that, as shown in Figs. 1, 5, and 6, the opposing faces intermediate the top and bottom portions of the bars are concave so as to provide, for a purpose which will be described, a space between the bars. As can be clearly seen in Fig. 2 the bars 16 and 23 are offset on each side of the centre-line of the platform 5. Connecting the upper portions of the bars 16 and 23 is a pair of straps 24 and 25 of steel, preferably spring steel. The straps 24 and 25 are each formed with an intermediate portion which is of reduced thickness as compared with the end portions and these end portions are secured to the vertical bars 16 and 23, the strap 24 being fixed, see Figs. 4 and 5, to the upper end of the bar 16 by a bolt 26 and to the upper end of the bar 23 by a bolt 27. The lower strap 25 is fixed to the upper end of the bar 16 by a bolt 28 and to the bar 23 by a pair of bolts 29. As can be seen clearly in Fig. 2 the straps 24 and 25 are disposed at right angles one to the other, the strap 24 being above the strap 25. As will be appreciated, the arrangements of the straps 24 and 25 permit the platform to pivot about a vertical axis as shown in Figure 8 which passes through the mid-points of the portions of reduced thickness of both straps. A similar arrangement of straps 30 and 31 is provided to connect the lower ends of the vertical bars 16 and 23, bolts 32 and 33 securing the straps 30 to vertical bars 16 and 23 respectively while bolts 34 and 35 similarly secure the strap 31 to the bars 16 and 23. The vertical axis about which the platform 5 is arranged to pivot will also pass through the mid-points of the portions of reduced thickness of the straps 30 and 31. As is shown in Figs. 1, 4, and 5, the position of the bolts 15 by which the bar 16 is connected at its lower end to the underside of the platform 5 is below the lower pair of straps 30 and 31. The means described for pivotally mounting the platform on the column 1 is applicable, as will be obvious, to cases where the pivotal member is required to move through only a comparatively small arc but it avoids the friction of conventional bearings and enables the platform 5 to be movable under the application of only a small horizontal force. Of the two pairs of straps described the straps 25 and 31 serve to support the weight of the platform 5 and pillar 6.

Figure 2:
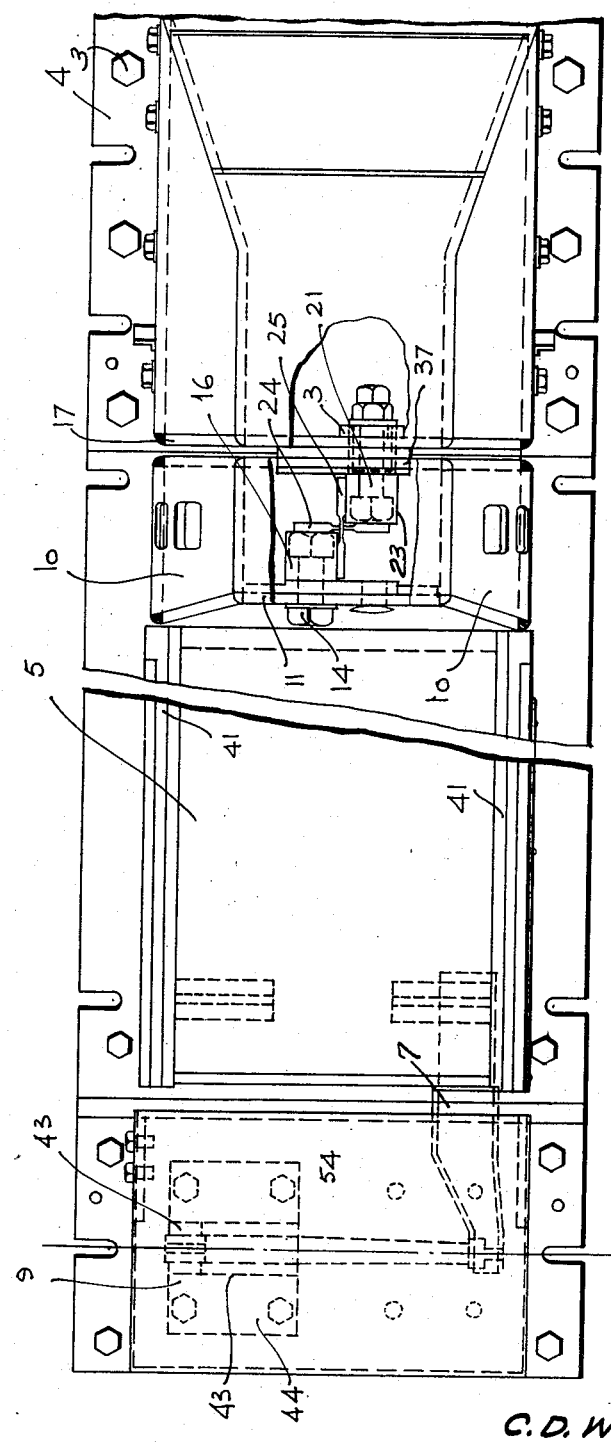
Figure 3:
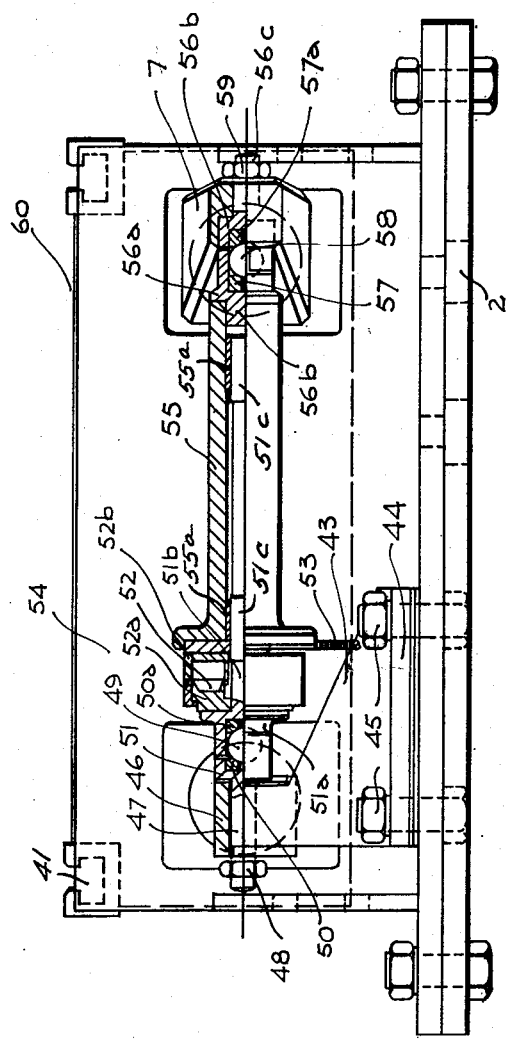
Fig. 3 is a part sectional view on a larger scale showing the measuring device.

When the test bench is first installed care is taken to ensure that the platform is level but in order that fine adjustment of the platform level transverse to the length thereof should be made, the invention provides the means seen in Figs. 1 and 2 and more clearly in Fig. 6. The bolt 21 passes through a bush 36 in such a manner that the bolt is eccentric in the bush. The bush 36 in turn is housed in a bore in the block 37, this block as stated above being vertically slidable in guides 38 in the wall 17 of the column 1. The bush 36 has a flange 36a which abuts against the rear face of the block 37 and the block 37 has a flange 37a which abuts on the wall 17. Formed integral with the bush 36 is a nut 36b. In order to level the platform 5, the nut 21a on the bolt 21 is loosened as is the nut 22a on the bolt 22. The nut 36b, and consequently the bush 36, is then turned until level is obtained, and the nuts 21a and 22a tightened up. When the nut 36b is turned, the upper portion of the vertical bar 23 is moved about the axis of the bolt 22 and the bar 16, together with the pillar 6 and platform 5 are tilted in the required direction. The vertical movement of the axis of the bush 36 consequent on its pivotal movement about the axis of the bolt 22, is provided for by arranging the block 37 to be vertically slidable in the guides 38.

The space defined by the opposite concave faces of the vertical bars 16 and 23 is provided to accommodate flexible fuel and other pipe leads to an engine mounted on the platform 5 in such manner that these leads extend one above the other in the plane containing the vertical axis about which the platform is arranged to pivot. This arrangement of the various pipe leads reduces the load which these leads would otherwise impose and which would have to be overcome when the platform is moved. The movement of the leads is also maintained small so that liability to breakage is reduced.

The engine 39 to be tested is, as shown in Fig. 8, supported by upright engine bearers 40 which are slidable along the platform in T-guides 41. Engine bearers of different heights may be employed to suit the particular engine to be tested. The bearers 40 are secured in the guides 41 in any position to which they may have been adjusted by any suitable known means.

The free end of the platform 5 which, as will be recognised, is arranged as a cantilever beam, carries, fixed to it, a projecting arm 7. Spaced from the free-end of the platform 5 is a rigid support 9 which comprises a pair of upright members 43 rigid with a base 44 which is fastened to the base-plate 2 by bolts 45. The upright members 43 carry a bearing 46 in which is disposed a spindle 47 held in the bearing 46 by a nut 48. The spindle 47 is part of an assembly which comprises a ball-bearing formed by a single ball 49, thrust races 50 and 50a and the two parts 51 and 51a of the bearing housing.

The housing part 51a and thrust race 50a together with the ball 49 are carried by a hydraulic measuring instrument 54 known as a Statimeter, the housing part 51a having, integral with it, a rod 51b. The instrument comprises a capsule 52, having flexible walls, which contains liquid, for example water, and the interior of the capsule 52 communicates by a duct 53 with an indicating mechanism of the clock type which is not shown and which may be mounted at a position remote from the test bench.

The capsule 52 is arranged to be compressed by the relative movement, one towards the other, of the members 52a and 52b. The instrument 54 is fitted into a tubular member 55 in which is fitted, at its end remote from the instrument, the projection 56b of a ball-bearing housing part 56a. The part 56a carries a thrust race 57 and ball 58. The other housing part 56b and thrust race 57a are carried in a bore formed in the free end of the arm 7, the housing part 56b and thrust race 57a being secured in the arm 7 by a nut 59 which screws on to a rod 56c integral with the housing part 56b. The rod 51b is formed with portions 51c of enlarged diameter which rests in bearings 55a in the tubular member 55 and serves to align the various parts of the instrument assembly. A cover 60 is provided over the arm 7 and the instrument assembly.

In an alternative construction the pivot assembly may, instead of the resilient straps described above, comprise a pair of stub shafts fixed to the pillar 6 and extending vertically to engage in fixed roller bearings mounted on the column 1, the lower bearing at least being a thrust bearing.

Figure 9:
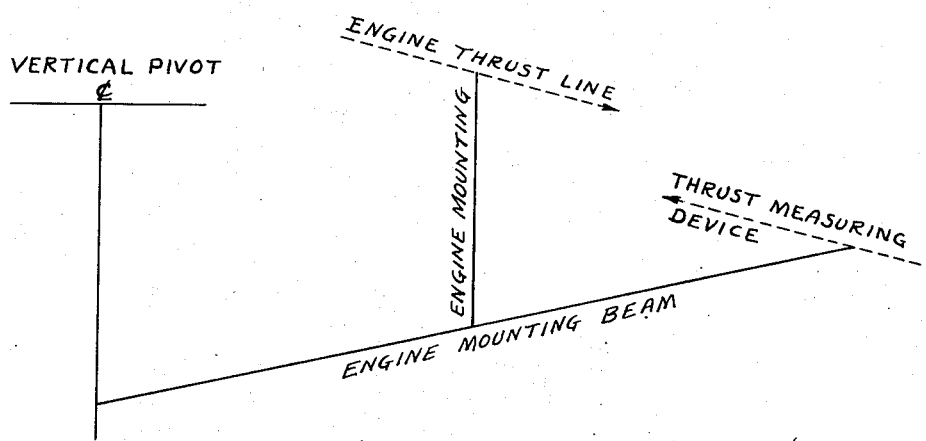
Fig. 9 is a line diagram illustrating the orientation of the various parts of the invention and the directions of the pivot axis, of the engine propulsive thrust and of the reaction of the thrust measuring device.

The relative disposition of the platform or beam 1 on which the engine to be tested is mounted, the direction of the pivot axis, of the engine propulsive thrust and of the reaction of the thrust measuring device 54 are clearly shown in Fig. 9.

It will readily be appreciated that the construction shown greatly facilitates the handling of jet engines which are to be tested. The platform 5 is easily arranged at a low level so that lifting of the engine can be reduced to a minimum. The upper surface of the platform is, furthermore, open completely, that is free from obstructions, at one end of the platform and along its length up to the pillar 6 so that the engine to be tested is easily placed in position on the platform. By arranging that the platform moves about a vertical axis the weight of the engine produces no components which would affect the indication of the measuring device and which would have to be corrected for were the platform movable about a horizontal or inclined axis.

The testing of an engine is easily carried out. As will have been understood, the platform 5 is movable only about a vertical axis which passes through the mid-points of the portions of reduced thickness of the straps 24 and 25. The movements of the platform which are produced by the engine thrust are transmitted to the measuring device and are read off on a suitably graduated scale of the instrument. The straps which pivotally support the platform also provide restraining forces which bias the platform to a zero position. As will be appreciated the measuring instrument described will also produce a restraining force acting on the platform. In practice the total deflection when an engine is being tested is small and the relative movement of the walls of the capsule 52 is, in practice, only of the order of thousandths of an inch.

I claim:

1. An engine test bench comprising a beam, a fixed support, vertically spaced pivot means securing said beam to said support for pivotal movement of the beam about a vertical axis, means for securing an engine to the beam between an end of the beam and the said pivot means, flexible fuel leads disposed one above the other between the vertically spaced pivot means, and thrust measuring means actuatable by pivotal movement of the beam about the said vertical axis.

2. An engine test bench which comprises a platform, a fixed support, vertically spaced pairs of resilient straps constituting pivot means connecting one end of the platform to the support and also constituting means restraining the platform from movement about a horizontal axis and exerting a force resiliently opposing movement of the platform about a vertical axis, each said pair of straps comprising one strap connected at one end thereof to the platform and at the other end to the support and another strap extending transversely to the first strap and having one end thereof connected to the platform and the other end to the support, means for securing an engine to the platform between the two ends of the platform and measuring means actuatable by pivotal movement of the platform about a vertical axis which intersects the straps of each of the said pairs.

3. An engine test bench as claimed in claim 2 comprising a pivot below the said straps, an arm oscillatable about said pivot and connected to said straps and adjusting means for moving said platform and said straps as a whole about said pivot.

4. An engine test bench which comprises a platform, a fixed support, spaced resilient straps constituting pivot means connecting one end of the platform to the support for movement about a pivotal axis and also constituting means restraining the platform from movement about an axis other than said pivotal axis and exerting a force resiliently opposing movement of the platform about said pivotal axis, said straps comprising at least one strap connected at one end thereof to the platform and at the other end to the support and a plurality of other straps extending transversely to the first strap and each having one end thereof connected to the platform and the other end to the support, means for securing an engine to the platform between the two ends of the platform, measuring means actuatable by movement of the platform about said pivotal axis, a pivot on one side of said straps, an arm oscillatable about said pivot and connected to said straps and adjusting means for moving said platform and said straps as a whole about said pivot.

5. An engine test bench which comprises an engine support, pivot means supporting said engine support for movement of the support about a vertical axis, mounting means for securing an engine to the support between the said axis and an end of the support whereby the propulsive thrust of the engine is directed transversely to the said vertical axis and measuring means responsive to the thrust exerted by the support at a position displaced from the said axis.

6. An engine test bench which comprises a beam, means pivotally supporting said beam for movement of one end of said beam about a vertical axis, means between the said end of the beam and the said axis for mounting an engine on the beam with the direction of the propulsive thrust of the engine directed transversely to the said axis and measuring means actuatable by movement of the beam about the said axis.

CYRIL DORKING WHITEHEAD.

References Cited in the file of this patent

UNITED STATES PATENTS

| Number | Name | Date |
|---|---|---|
| 1,988,527 | Truman | Jan. 22, 1935 |
| 2,498,995 | Manning | Feb. 28, 1950 |
| 2,516,855 | Conway | Aug. 1, 1950 |

FOREIGN PATENTS

| Number | Country | Date |
|---|---|---|
| 242,912 | Germany | Jan. 26, 1912 |
| 116,045 | Great Britain | May 30, 1918 |
| 595,710 | Great Britain | Dec. 15, 1947 |